United States Patent

[11] 3,628,001

[72] Inventor William J. Niblock
Eire, Ireland
[21] Appl. No. 854,997
[22] Filed Sept. 3, 1969
[45] Patented Dec. 14, 1971
[73] Assignee Qeleq Limited
Dublin, Ireland
[32] Priority Sept. 4, 1968
[33] Great Britain
[31] 42,125/68

[54] LINEAR PROGRAMMING ANALOGUE COMPUTER WITH AUTOMATIC MEANS FOR OPTIMIZING

8 Claims, 5 Drawing Figs.

[52] U.S. Cl. .......... 235/180,
235/184, 235/193
[51] Int. Cl. .......... G06g 7/34
[50] Field of Search .......... 235/180,
184, 193, 179

[56] References Cited

UNITED STATES PATENTS 3,134,017 5/1964 Burhans et al. .......... 235/180
3,443,078 5/1969 Noronha et al. .......... 235/180 X

*Primary Examiner*—Malcolm A. Morrison
*Assistant Examiner*—Felix D. Gruber
*Attorney*—Mason, Fenwick & Lawrence

ABSTRACT: An analogue computer arranged for the solution of linear programming problems by the method of steepest ascents comprises a plurality of integrators, summing amplifiers and error-signal-defining amplifiers arranged in various interconnected signal-conducting paths and the signal-representative of the objective function is optimized automatically by deriving a correction signal from the signal-conducting paths and adding the correction signal to a signal of constant amplitude. The correction signal may be proportional to the maximum absolute value of error signal or the maximum positive or negative error signal appearing at the outputs of the error-signal-defining amplifiers.

*Inventor*

WILLIAM JOHN NIBLOCK

By Mason, Fenwick & Lawrence

*Attorneys*

Inventor
WILLIAM JOHN NIBLOCK
By Mason, Fenwick & Lawrence
Attorneys

Inventor
WILLIAM JOHN NIBLOCK
By
Mason, Fenwick & Lawrence
Attorneys

LINEAR PROGRAMMING ANALOGUE COMPUTER WITH AUTOMATIC MEANS FOR OPTIMIZING

This invention relates to an analogue computer, and more particularly to analogue computers arranged for the solution of so-called "linear programming" problems by the method of steepest ascents.

The solution of generalized linear programming problems by the method of steepest ascents and arrangements for the simulation of this method on an analogue computer are described by Insley B. Pyne in the article entitled "Linear Programming on an Electronic Analogue Computer" published in Proc IEE, vol. 75, May 1956; in the book "Electronic Analogue Computers" (Second Edition) by Korn and Korn, commencing at page 147, and in the book "Analogue Computation and Simulation" by Roger R. Jenness.

In each of the aforementioned articles the general linear programming problem is considered in mathematical terms, and its solution by the method of steepest ascents is shown to consist in the solution of a set of simultaneous equations of the form $$dX_i/dt = -K_1[A_1 f_{i1} + A_2 f_{i2} + \cdots + A_n f_{in}] - K_2 C_i \qquad (1)$$

where $K_1$ $K_2$ are constants;

$X_i$ and $f_{ij}$ are variables;

$C_i$ is a parameter related to $X_i$ and $A_i$ is an "error" parameter related to $f_{ij}$.

The problem consists of determining specific values of $X_i$ such that the values of $$\sum_{i=1}^{N} f_{ij}$$

lie within predetermined limits, under which conditions $A_i$ is zero, and the value of an "objective function", which is related to $C_i$ is optimized. Typically the objective function is cost and the problem is optimized by achieving minimum cost.

One example of the linear programming problem is to determine the minimum cost of unit weight of a mixture of N constituents whose relative proportions by weight in the mixture are specified either exactly or within limits, the N constituents being contained in known proportions in M ingredients whose cost per unit weight is known. It is also required to determine the specific quantities of the M ingredients required in the mixture to achieve minimum cost.

In equation (1) above $X_i$ would therefore represent the quantity of the $i^{th}$ ingredient present in the mixture, $f_{i1}$ would represent the quantity of the 1st constituent contributed by the $i^{th}$ ingredient, and $C_i$ the cost per unit weight of the $i^{th}$ ingredient.

In the above-mentioned article by Pyne the arrangement of simulating the solution to a set of equations in the form of (1) above, consists of providing a bank of integrators in parallel each with a bank of potentiometers associated with its output. The output signal from one integrator represents a problem variable or the amount of the $i^{th}$ ingredient present in the mixture ($X_i$), which ingredient has constituents ($f_{i1}$, $f_{i2}$, etc.) whose relative proportions are known and are set on the potentiometers associated with the pertaining integrator. Summing amplifiers are provided to sum the amount of each constituent $f_1$, $f_2$ in the mixture and the output of each summing amplifier is fed to an error amplifier to which signals representative of the permitted range of the pertaining constituent in the mixture are also fed. The output of the error amplifier is zero when the amount of the constituent ($f_1$ say) lies within the permitted range, and an error signal is produced if this condition is not satisfied. A bank of potentiometers is connected to the output of each error amplifier from which the percentages of the various constituents in the $i^{th}$ ingredient are taken and fed as a summed input to the integrator whose output represents the problem variable $X_i$. A second input is fed to each integrator which is representative of the cost of the pertaining ingredient. This input is obtained from a constant voltage source which is connected to the input of a variable gain amplifying device, and the output of this device which represents the total cost of the mixture is connected to a bank of potentiometers, one for each ingredient in the mixture, from which the voltages representative of the various ingredients are fed to the integrators.

In order to solve the problem the computer operator is obliged manually to vary the gain of the variable gain amplifying device until such time as the output voltage therefrom is minimized, and the output voltage of each error amplifier lies within the specified limits.

It is an object of the present invention to provide a special purpose analogue computer arranged for the solution of linear programming problems by the method of steepest ascents and wherein automatic means is provided for optimizing the objective function.

According to the present invention there is provided an analogue computer arranged for solving a linear programming problem by the method of steepest ascents, comprising a plurality of interconnected signal-conducting loops, each of which contains an integrator, a summing amplifier and an error-signal-defining amplifier, and wherein the objective function to be optimized is represented by a signal derived from the computer by means connected in the signal-conducting loops.

Embodiments of the present invention will now be described by way of example with reference to the accompanying drawings, in which.

Figure 1:
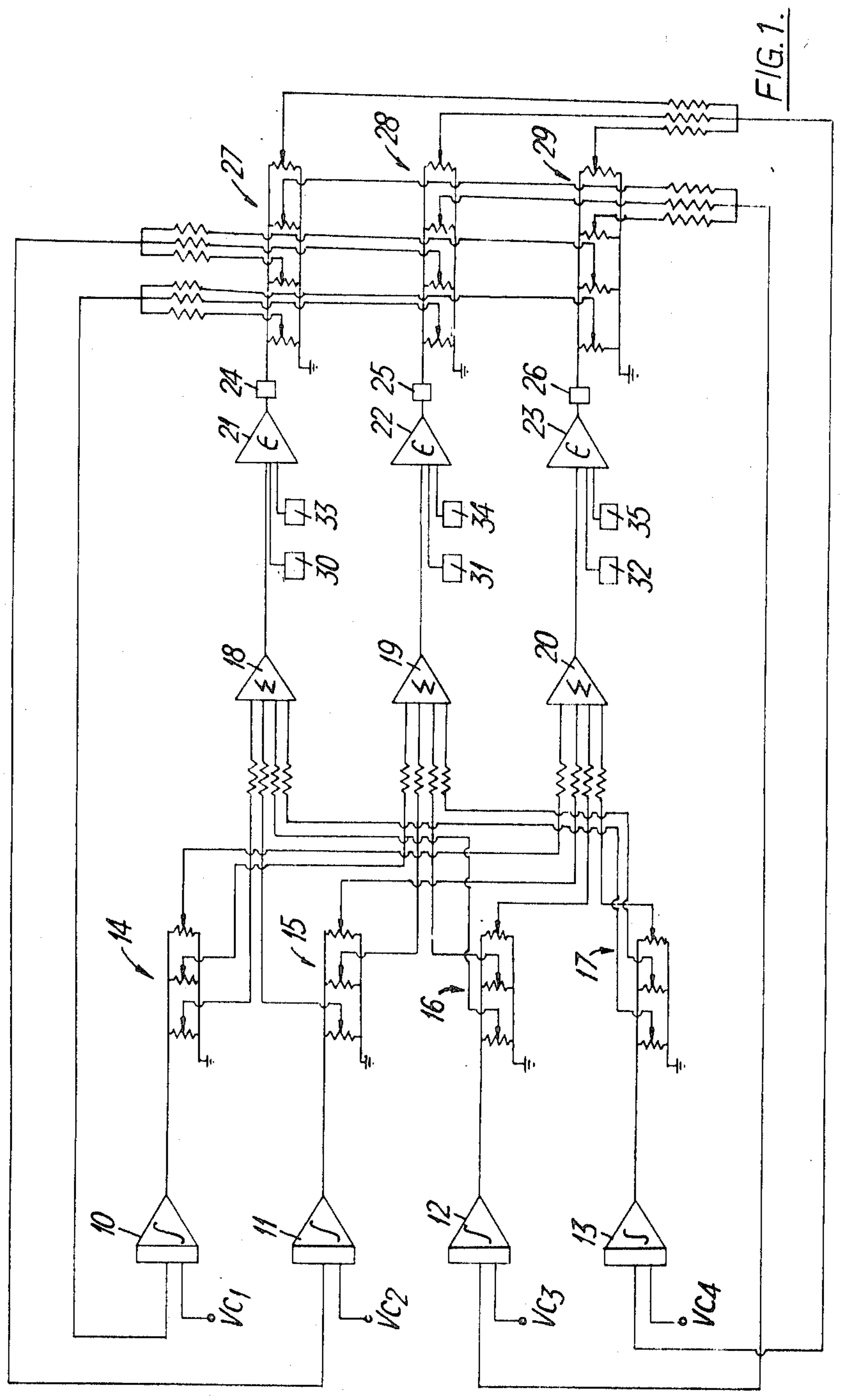
FIG. 1 is a schematic diagram of an analogue computer according to the present invention, arranged to solve a particular linear programming problem.

In FIG. 1 of the drawings there is shown an analogue computer according to the present invention, and arranged to solve the problem of determining the proportions of each of four ingredients ($X_1$, $X_2$–$X_4$) in a mixture having three constituents ($f_1$, $f_2$, $f_3$) whose relative proportions within the mixture are specified within upper and lower limits. Each of the four ingredients contains the three constituents in known proportions, and the cost of each ingredient is known.

Four integrators 10, 11, 12 and 13 are provided, one representative of each ingredient and four potentiometer banks 14, 15, 16 and 17 are respectively connected to the outputs of the integrators. Each bank 14—17 has three potentiometers, one for each constituent in the mixture, and the outputs from the first potentiometer in each bank 14–17 are summed in an amplifier 18, the output voltage of which is representative of the total quantity of the first constituent ($f_1$) in the mixture. Similarly the outputs from the remaining corresponding potentiometers in the banks 14–17 are summed in amplifiers 19, 20 to provide signals representative of the total quantity of the second ($f_2$) and third ($f_3$) constituents in the mixture.

The outputs of the summing amplifiers 18–20 are respectively connected to the inputs of three error amplifiers 21, 22, 23, each of which has two other inputs, one representative of the minimum quantity of the constituent and one representative of the maximum quantity of the constituent acceptable in the mixture. These inputs are represented by the blocks 30 and 35, 31 and 34, 32 and 35 for the amplifiers 21, 22, and 23 respectively.

Figure 2:
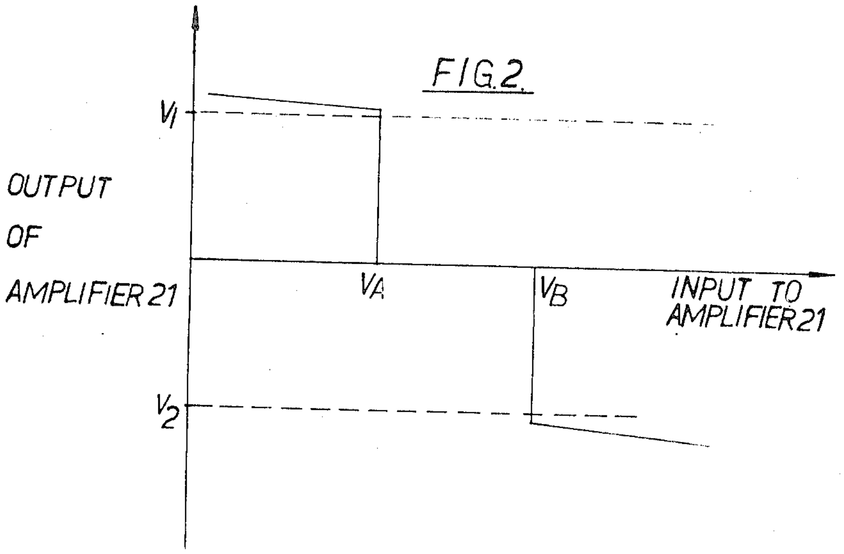
FIG. 2 illustrates the waveform of the output signal from one of the error amplifiers of FIG. 1.

The signal appearing at the output of the amplifier 21, as shown in FIG. 2, is greater than $+V_1$ volts if $f_1 < V_A$, where $V_A$ is the lower limiting value set by the block 30; more negative than $-V_2$ volts if $f_1 > V_B$, where $V_B$ is the upper limiting value set by the block 33; and, zero volts if $V_A < f_1 < V_B$. If $f_1 = V_A$ then the output signal may lie between 0 and $+V_1$ volts, and if $f_1 = V_B$ then the output signal may lie between 0 and $-V_2$ volts.

Diode dead-zone networks 24, 25 and 26 are respectively connected to the outputs of the amplifiers 21, 22 and 23 so as to avoid the occurrence of an unwanted error signal resulting from amplifier offset, and connected to the output of each dead-zone network is a bank of four potentiometers 27, 28, and 29, one for each ingredient in the mixture. The outputs from the first potentiometer in each bank 27–29 are fed through summing resistors to the input of the integrator 10, and similarly the outputs of the second, third and fourth potentiometers in each bank 27–29 are fed through summing amplifiers to the inputs of the integrators 11, 12 and 13 respectively. In this way the proportions of the three constituents in each ingredient are summed.

The integrators 10–13 have a second input signal, Vc1, Vc2, Vc3, Vc4 respectively, which is a signal representative of the cost of the ingredient represented by the output of the pertaining integrator. That is the signal Vc1 is representative of the cost of the first ingredient, the quantity $X_1$ of which is present in the mixture.

Figure 3:
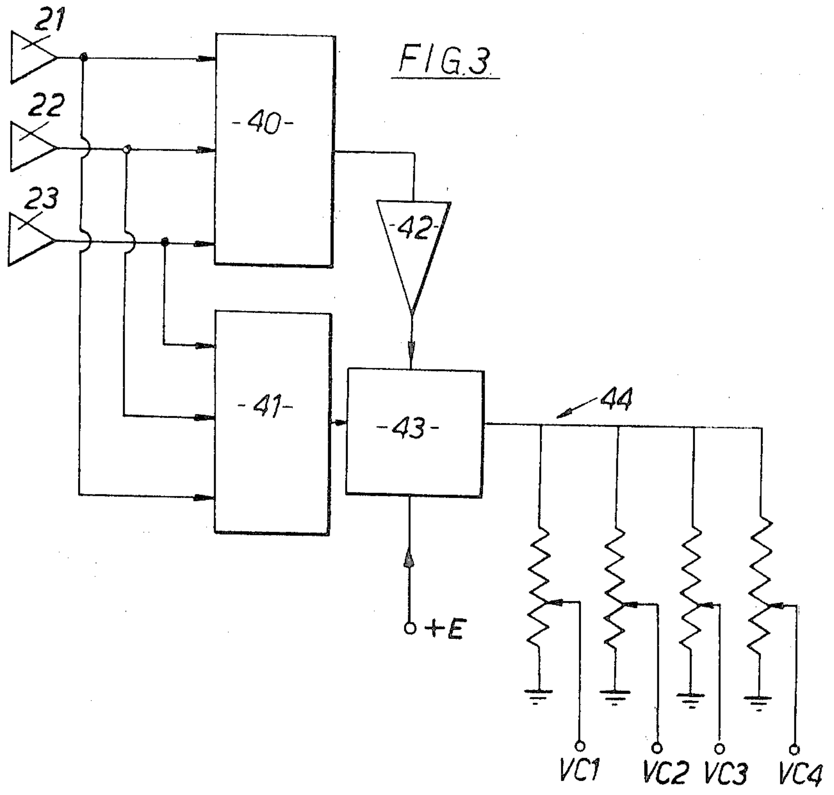
FIG. 3 is a block diagram of a circuit for deriving a voltage representative of the objective function.

In order to provide the signals Vc1–Vc4, the circuit shown in block diagrammatic form in FIG. 3 is provided wherein the error signals appearing at the outputs of the error amplifiers, 21, 22 and 23 are fed into a first gate 40 which selects the largest positive signal; of those signals applied to the input of the gate; and into a second gate 41 which selects the largest negative signal of those signals applied to the input of the gate. The output from the gate 40 is inverted by an amplifier 42 to provide a negative signal equal in magnitude to the largest positive error signal, and the two negative signals produced by the gate 41 and by the amplifier 42 are compared in a third gate 43 which selects the larger negative signal and produces an output voltage related to the larger negative signal and to a third input signal of + E volts as will be explained in greater detail with reference to FIGS. 4 and 5. A potentiometer bank 44 is connected to the output of the gate 43, and the four potentiometers of this bank 44 are respectively set to provide the signals Vc1, Vc2, Vc3 and Vc4.

As previously explained with reference to the error amplifier 21 the output signal therefrom, or error signal, is constrained to lie within approximately $+V_1+\delta$ volts and approximately $-(V_2+\delta)$ volts for all values of the input signal $f_1$, where $\delta$ is a relatively small voltage and the error signal from the other error amplifiers 22 and 23 is similarly constrained so that the amplitude of the maximum signal at the output of the gate 43 is predetermined. However, due to the dynamic nature of the computer when in operation the signal at the output of the gate 43 continually varies in amplitude and has a mean value which is sufficiently large to cause the computer to optimize the objective function, i.e. total cost, without breaking the problem conditions.

Figure 4:
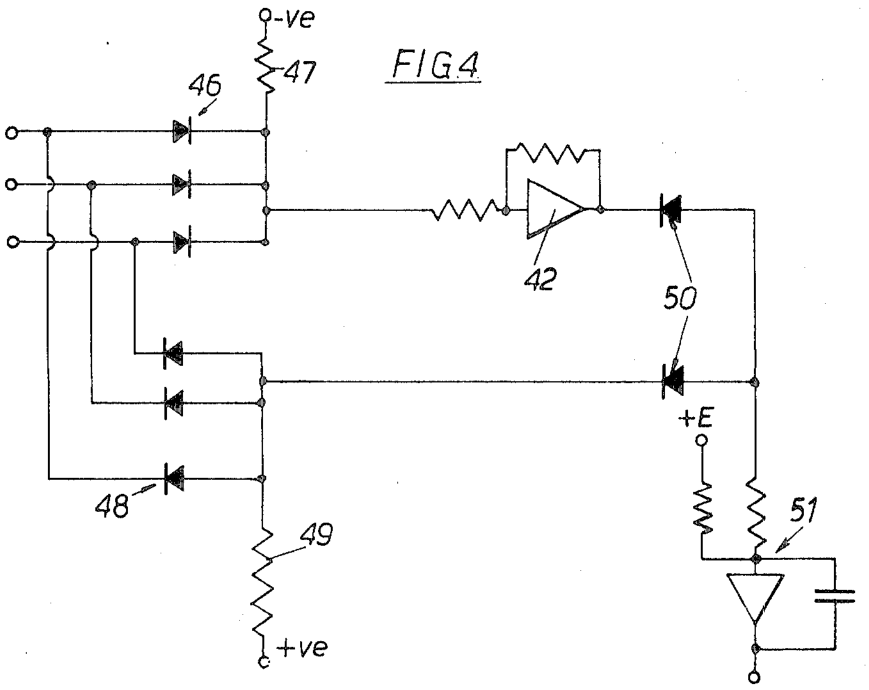
FIGS. 4 and 5 illustrate alternative circuits represented by the block diagram of FIG. 3.

One form of the circuit of FIG. 3 is shown in detail in FIG. 4 wherein the first gate 40 is shown to include three diodes 46 whose cathodes are connected in parallel through a resistor 47 to a negative source of voltage and in this way an OR gate is provided. Also, the second gate 41 is shown to include three diodes 48 whose anodes are connected in parallel through a resistor 49 to a positive source of voltage, thereby providing a second OR gate. The output of the first OR gate is passed through an amplifier 42 of unity gain and into the gate 43 which includes a comparator having two diodes 50 whose anodes are connected together to one input of a high-speed integrator 51. The voltage +E is fed to a second input of the integrator 51 in order to 'bias' the integrator, the output of the second OR gate is passed directly into the gate 43, and the output of the integrator 51 feeds the potentiometer bank 44.

Figure 5:
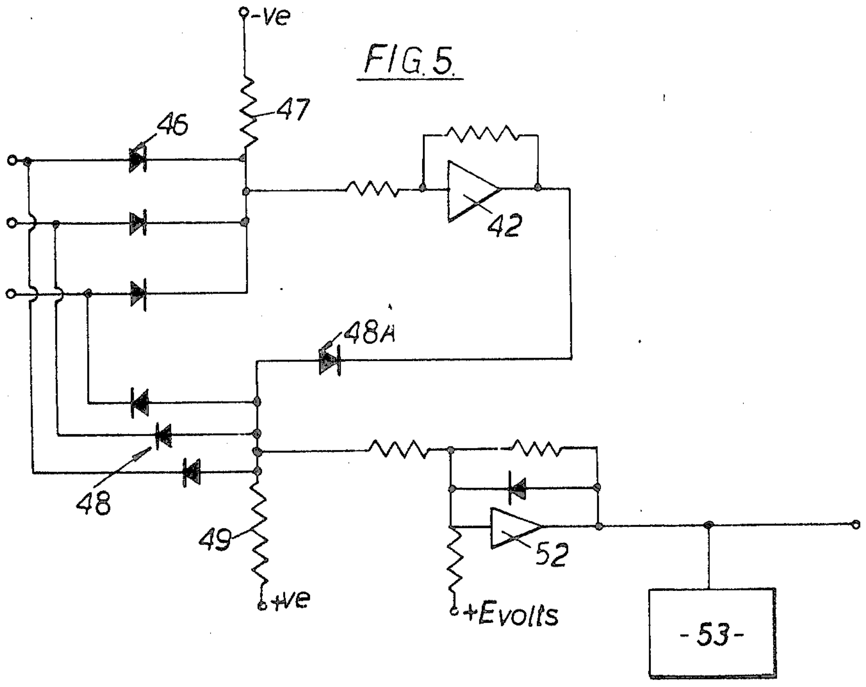

Another form of the circuit of FIG. 3 is shown in detail in FIG. 5 wherein the first gate 40 is identical to that of FIG. 4 and includes three diodes 46 and a resistor 47 connected to a negative source of voltage. The output of the gate 40 is also connected to the amplifier 42. The second gate 41 is similar to the that shown in FIG. 4 in that it includes three diodes 48 whose anodes are connected together through a resistor 49 to a positive source of voltage. The third gate 43, in this case, includes only one diode 48A, whose anode is connected to the anodes of the diodes 48 and whose cathode is connected to the output of the amplifier 42. The output of the gate 41, which is a negative voltage, is then fed directly to one input of a summing amplifier 52 and the positive reference voltage E is fed to a second input. The amplifier 52 has a gain of three and a diode is connected in parallel with the feedback resistor to prevent the output signal going positive. The output of the amplifier 52 feeds the potentiometer bank 44 and provides a signal of the form $$Vout = -3(E-|\hat{\epsilon}|)$$

where $|\hat{\epsilon}|$ is the output signal from the gate 41.

It will therefore be understood that in the case of simple problems where the error voltages are small, say in the region of 2–4 volts and E is set at +10 volts, the output of the amplifier 52 is fairly large (about −20 volts), but where the problem is quite difficult and errors of 8–9 volts are generated (equivalent to one or more of the error amplifiers being on a limiting condition) the output of the amplifier 52 is quite low (about −4 volts). If the problem is impossible and the error voltages cannot be reduced below 10 volts the output of the amplifier 52 is clamped at zero volts.

In order to detect the case of a problem which cannot be solved a zero or null detector 53 is connected to the output of the amplifier 52 and is used to provide a visual or audible warning to the computer operator. The detector 53 may also be used to switch the computer automatically into a problem hold condition or into the reset condition in order to prevent overloading of the elements of the computer.

Various modifications may be made to the above-described computer, for example the amplifier of FIG. 5 may be substituted for the integrator of FIG. 4. In FIG. 1 upper and lower limit-setting devices may be associated with each of the integrators 10 –13, for it will be understood that it may be desirable to constrain the amount of one or all of the various ingredients in the mixture in addition to constraining the amount of the various constituents of the mixture. Also, each of the integrators 10–13 and error amplifiers 21–23 may have a detector associated with the output thereof in order to detect when each output signal is on a limiting condition. Each of these detectors may have one or more lights which can be illuminated when either the upper or lower limit is achieved. Moreover, readout means for the computer is associated with each amplifier and indicator so that the computer operator may obtain a numerical indication of the solution to the problem.

The computer described with reference to the accompanying drawings is set up to provide the solution to a particular problem wherein the objective function is cost and optimization of the objective function consists in minimizing cost. It will however be realized that for certain linear programming problems optimization of the objective function consists in maximization thereof. In the block diagram of FIG. 3 in order to provide an objective function for maximation the amplifier 42 is connected to the output of the gate 41 and the polarity of the voltage E fed to the gate 43 reversed so that the output signal from the comparator 43 is related to the largest positive error signal. The detailed circuits of FIGS. 4 and 5 if correspondingly modified will also provide this performance.

In a still further modification the signals fed to the gates 40 and 41 of FIG. 3 are the outputs of the diode dead-zone networks 24–26.

I claim:

1. An analogue computer for solving a linear programming problem defined by M number of equations in N number of variables in order to optimize an objective function by the method of steepest ascents, said computer including:

N electronic integrators each having first input means for connection to M input signals and having a second input;

N groups of M signal conductors connected in parallel, the N groups being respectively connected to the outputs of the N integrators;

M summing amplifiers each having N inputs, the outputs of each of the M signal conductors of the N groups being respectively connected to an input of the M summing amplifiers;

M error amplifiers the inputs of which are respectively connected to the outputs of the M summing amplifiers;

M groups of signal conductors connected in parallel, the M groups being respectively connected to the outputs of the M error amplifiers and the first input means of the N integrators being respectively connected to one of the N signal conductors in each of the M groups; and objective-function-representative means comprising a two-input signal-summation device of which the output is connected to the second inputs of each of said N integrators, a source of DC voltage connected to one input of the signal-summation device, and gating means having inputs respectively connected to the outputs of the M error amplifiers and arranged to derive therefrom a signal of opposite polarity to that of the source of DC voltage, the gating means being connected to supply said derived signal to the other input of said signal-summation device.

2. An analogue computer as claimed in claim 1, wherein said gating means comprises first and second OR gates each having inputs respectively arranged to compare the amplitudes of signals of opposite polarity applied thereto and each to transmit the signal of maximum amplitude, one of said transmitted signals being coupled to the output of the gating means.

3. An analogue computer as claimed in claim 2, wherein said gating means further comprises a third OR gate having two inputs respectively connected to the outputs of the first and second OR gates and arranged to compare the amplitudes of said transmitted signals and to couple the transmitted signal of larger amplitude to the output of the gating means.

4. An analogue computer as claimed in claim 1, wherein said gating means comprises an OR gate having inputs respectively connected to the outputs of the error amplifiers, said OR gate being arranged to compare the amplitudes of signals of common polarity applied thereto and to transmit the signal of maximum amplitude to the output of the gating means.

5. An analogue computer as claimed in claim 1, wherein said signal-summation device is in the form of a high-speed integrator.

6. An analogue computer as claimed in claim 1, wherein said signal-summation device is in the form of an amplifier having a gain in the range 4–5 and to the output of which a null detector is connected.

7. An analogue computer as claimed in claim 1, including diode dead-zone networks respectively connected intermediate the error-amplifiers and the inputs of said gating means.

8. An analogue computer as claimed in claim 1, wherein each of said signal conductors is a potentiometer and said gating means has M inputs.

* * * * *